United States Patent
Chen et al.

(10) Patent No.: US 6,275,536 B1
(45) Date of Patent: Aug. 14, 2001

(54) IMPLEMENTATION ARCHITECTURES OF A MULTI-CHANNEL MPEG VIDEO TRANSCODER USING MULTIPLE PROGRAMMABLE PROCESSORS

(75) Inventors: Xuemin Chen; Fan Ling, both of San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/338,873

(22) Filed: Jun. 23, 1999

(51) Int. Cl.[7] .................................................... H04N 7/12
(52) U.S. Cl. ................................... 375/240.25; 382/234
(58) Field of Search ........................... 375/240.01, 240.1, 375/240.25; 348/423.1; 370/535, 473; 382/234, 235

(56) References Cited

U.S. PATENT DOCUMENTS

| | | |
|---|---|---|
| 5,477,397 | 12/1995 | Naimpally et al. . |
| 5,532,744 | 7/1996 | Akiwumi-Assani et al. . |
| 5,617,142 | 4/1997 | Hamilton . |
| 5,619,733 | 4/1997 | Noe et al. . |
| 5,731,837 * | 3/1998 | Hurst, Jr. .............................. 348/405 |
| 5,838,664 * | 11/1998 | Polomski ............................. 370/263 |
| 5,920,572 | 7/1999 | Washington et al. . |
| 5,923,814 | 7/1999 | Boyce . |
| 5,933,500 | 8/1999 | Blatter et al. . |
| 5,963,260 * | 10/1999 | Bakhmutsky ........................ 348/420 |

FOREIGN PATENT DOCUMENTS 0 627 854   12/1994  (EP) ................................ H04N/5/92

OTHER PUBLICATIONS

Boyce, J.M., "Data Selection Strategies for Digital VCR Long Play Mode," *Digest of Technical Papers for the International Conference on Consumer Electronics*, New York, Jun. 21, 1994, pp. 32–33.

(List continued on next page.)

*Primary Examiner*—Vu Le
(74) *Attorney, Agent, or Firm*—Barry R. Lipsitz (57) ABSTRACT

A method and apparatus for transcoding of digital video images using a queuing system model. Multiple transcoding processors are arranged in parallel. In a first architecture, an input bitstream of n channels is partitioned into processing units, such as slices or frames, the processing units are split into m sub-streams, and each sub-stream is processed in a corresponding branch. A separate queue is provided for each sub-stream. In a second architecture, the processing units are assigned to any available processor from a common queue. Independent processing units are processed concurrently according to the queuing system model to minimize an average processing time. In particular, processing of a reference picture (I-picture) unit and an associated predicted picture (P- or B-picture unit) unit at the same time is avoided. A further technique performs record-keeping and coordinates the transfer of the reference picture unit from its processor to the processor for the associated predicted picture unit after the reference picture unit has been processed. Embodiments with picture re-ordering and use of a priority buffer are also provided.

21 Claims, 6 Drawing Sheets

OTHER PUBLICATIONS

Björk, Niklas et al., "Transcoder Architectures for Video Coding," IEEE Transactions on Consumer Electronics, vol. 44, No. 1, Feb. 1998, pp. 88–98.

Staff of Cable Television Laboratories Inc., "Digital TV Solutions," From the Labs: Cable World, Feb. 1, 1999.

Gebeloff,Rob., "The Missing Link," http://www.talks.com/interactive/misslinkx.html.

Chen, Xuemin, "Synchronization and Control of Multi-threads for MPEG–4 Video Decoder", 1999 Digest of Technical Papers, *International Conference on Consumer Electronics* (Cat. No. 99CH36277), Los Angeles, CA, USA, Jun. 22-24, 1999, pp. 298–299.

Yung, N.H.C. et al., "Fast and Parallel Video Encoding by Workload Balancing", SMC '98 Conference Proceedings, *1998 IEEE International Conference on Systems, Man, and Cybernetics* (Cat. No. 98CH36218), San Diego, CA, USA, Oct. 11–14, 1998, pp. 4642–4647.

Keesman, Gertjan et al., "Transcoding of MPEG Bitstreams", *Signal Processing: Image Communications*, Elsevier Science Publishers, Amersterdam, vol. 8 No. 6, Sep. 1, 1996, pp. 481–500.

Jeon, J.H. et al., "A Real–Time Encoding/Decoding System (REDS) for HDTV Editing", *1998 IEEE Second Workshop on Multimedia Signal Processing* (Cat. No. 98EX175), Redondo Beach, CA, USA, Dec. 7–9, 1998, pp. 215–220.

Leon–Garcia, Alberto. *Probability and Random Processes for Electrical Engineering*, Addison–Wesley Publishing Company, Sep., 1993, Chapter 9, "Introduction to Queueing Theory," pp. 499–521.

\* cited by examiner

IMPLEMENTATION ARCHITECTURES OF A MULTI-CHANNEL MPEG VIDEO TRANSCODER USING MULTIPLE PROGRAMMABLE PROCESSORS

BACKGROUND OF THE INVENTION

The present invention relates to transcoding of digital video images, and to particular architectures for using multiple transcoding processors operating in parallel.

The transmission of digital video data, e.g., via broadband communication systems such as cable television or satellite television networks, has become increasingly popular. Digital decoders/set-top boxes are provided in consumers' homes for use in receiving the digital video signals and processing the signals in a format that is suitable for display on a television or video display terminal.

In general, source video sequences can be of any format, e.g., in terms of spatial resolution, frame rate, frame size, color sampling format, interlaced or progressive scan format, bit rate, resolution (e.g., high-definition or standard definition), or amount and type of noise filtering. Additionally, the source video sequences can be pre-encoded at any rate, and with a constant bit rate (CBR) or variable bit rate (VBR).

For many applications, however, the pre-compressed bitstreams must correspond with only specific allowable, or otherwise desirable, video formats and rates. Accordingly, it is often necessary to change the format or other characteristics of the video data prior to communicating it to a set-top box and/or some intermediate point in a network.

The required format changes can be provided by a transcoder. In general, a multi-channel video transcoder is an instrument that converts a set of pre-compressed video bitstreams, such as those conforming to the MPEG standard, into another set of video bitstreams. Such a converting instrument can perform many functions such as changing bit-rate, inserting and dropping bitstreams, transforming resolutions, and bitstream re-multiplexing, etc. Channels of data can be added and dropped. The elementary functional block of such an instrument is a single-channel MPEG-video transcoder.

A straightforward transcoder for an MPEG bitstream can simply be a cascaded MPEG decoder and encoder. The cascaded transcoder first decodes a compressed bitstream to obtain a reconstructed video sequence. The reconstructed video sequence is then re-encoded to obtain a different compressed bitstream that is suitable for transmission. Moreover, more efficient transcoders have been proposed that re-use motion vectors and minimize the changes of macroblock modes.

However, the complexity of the transcoder is still very high, in particular, due to the need for motion estimation of predicted images (e.g., P-pictures and B-pictures). Moreover, real-time transcoding of multiple channels is required. For example, the headend of a cable television network may use a transcoder to combine a satellite feed with local programming in real-time. The processing speed of the transcoder must be sufficient to perform the desired operations without perceptible delays.

Accordingly, it would be desirable to provide a more efficient transcoder architecture. The system should increase processing efficiency by providing multiple transcoding processors. The system should decrease overall processing time, and/or allow the use of lower speed processors.

The system should allow updates to transcoding algorithms to be easily implemented.

The system should accommodate upgrades to new and faster processors (chips) without major re-design.

The system should be more cost effective than specialized transcoding hardware.

The system should be suitable for transcoding multiple channels, such as standard definition video channels, or a single high-bit rate channel, such as an HDTV channel.

The present invention provides a system having the above and other advantages.

SUMMARY OF THE INVENTION

The present invention relates to transcoding of digital video images, and to particular architectures for using multiple transcoding processors operating in parallel.

In a first architecture (architecture A), an input bitstream of n channels is partitioned into processing units, the processing units (such as slices or frames) are split into m sub-streams, and each sub-stream is processed in a corresponding branch. A separate queue is provided for each sub-stream.

In a second architecture (architecture B), the processing units are assigned to any available processor. One queue is provided for all processors.

One option to enhance architecture A is to provide a buffer fullness feedback signal for each of the m branches, and to adjust the splitting of the bitstream such that the incoming data is sent to the emptiest queue (buffer).

With another enhancement for either architecture A or B, the processing units can be re-ordered in the queue(s) according to a shortest-size-first technique.

A further possible enhancement for architecture A, when one or more of the video streams is split into different sub-streams, and for architecture B, is to interleave the frames of different video bitstreams to ensure that every predicted processing unit has its reference processing unit available before the predicted processing unit is first in its queue.

A further possible enhancement for architecture A, when one or more video streams are split into different sub-streams, and for architecture B, is to provide a protection protocol that keeps track of predicted processing units and their correlated reference processing units to ensure that they are not processed at the same time (in different processors). The protection protocol delays the processing of the predicted processing unit until its corresponding reference processing unit has been processed. The transfer of the uncompressed reference processing unit to the processor with the predicted processing unit for motion compensation processing is also coordinated.

By ensuring that correlated processing units are not processed at the same time, a minimum average processing delay can be achieved.

Moreover, the above enhancements can generally be implemented at the same time.

The invention is suitable for transcoding multiple channels, such as standard definition video channels, or a single high-bit rate channel, such as an HDTV channel.

A particular method for transcoding a bitstream of digital video data includes the steps of: partitioning the bitstream into a plurality of successive processing units, queuing the processing units, and assigning each of the queued processing units according to a queuing system model to one of a number of available transcoding processors that are arranged in parallel.

In accordance with the queuing system model, the queued processing units may be assigned to the transcoding processors so that particular ones of the queued processing units that are independent from each other are processed concurrently.

In particular, in accordance with the queuing system model, the queued processing units may be assigned to the transcoding processors such that queued processing units of a reference image and queued processing units from a predicted image thereof are not processed concurrently.

The processing units can be slices, frames, fields, Video Object Planes (VOPs), or Groups of Blocks (GOBs), for example.

For architecture A, in the queuing step, the partitioned processing units are queued in a common queue. In the assigning step, the queued processing units are assigned to the transcoding processors from the common queue. One option here is for the partitioned processing units to be queued in the common queue in a shortest-size-processing unit-first manner.

The processing units may include a processing unit of a reference image, and a processing unit of a predicted image thereof. Moreover, the processing unit of the reference image may be queued in a first queue, and the processing unit of the predicted image is queued in a second, priority queue. After the queued processing unit of the reference image is assigned to the respective transcoding processor for processing, the queued processing unit of the predicted image has priority in being assigned to its respective transcoding processor.

In architecture A, the successive processing units are split into a plurality of sub-streams, the sub-streams of processing units are queued in respective queues, and the queued processing units are assigned to the transcoding processors from the respective queues.

In all schemes, the partitioned processing units may be queued in a shortest-size-processing unit-first manner. Or, for architecture A, queuing may be emptiest-queue-first.

In an interleaving or re-ordering technique, the bitstream has at least first and second video channels with respective pictures in respective picture orders. Pictures of the first video channel are interleaved with pictures from the second video channel such that correlated pictures of the respective first and second video channel are spaced further apart than in the respective picture orders. That is, correlated pictures in the first video channel are spaced further apart, and correlated pictures in the second video channel are spaced further apart.

This provides time for reference pictures to be processed and made available for motion compensation processing of the associated predicted pictures.

Similarly, the bitstream may have at least first and second video channels with respective groupings of pictures in respective grouping orders. Each grouping may have one picture, or a plurality of uncorrelated pictures. The groupings of pictures of the first video channel are interleaved with the groupings of pictures from the second video channel such that correlated groupings of the respective first and second video channel are spaced further apart than in the respective grouping orders.

Essentially, the interleaving positions the pictures in a common grouping closer together, or preferably adjacent, while spacing the pictures in different groupings apart.

In the protection protocol, the queued processing unit of a reference image, and the queued processing unit of a predicted image thereof are assigned to respective transcoding processors. The processing of the queued processing unit of the predicted image is delayed at its processor until the queued processing unit of the reference image has been processed.

To this end, a record (e.g., a task window and an acknowledgment window) is maintained of the assigned queued processing unit of the reference image, the assigned queued processing unit of the predicted image thereof, and the assigned processors. The record is updated when the queued processing unit of the reference image has been processed. The processing of the queued processing unit of the predicted image is delayed until the record has been updated to reflect that the queued processing unit of the reference image is available. The queued processing unit of the reference image is then provided its processor to the processor for the queued processing unit of the predicted image.

A corresponding apparatus is also disclosed.

DETAILED DESCRIPTION OF THE INVENTION

The present invention relates to transcoding of digital video images, and to particular architectures for using multiple transcoding processors operating in parallel.

Figure 1:
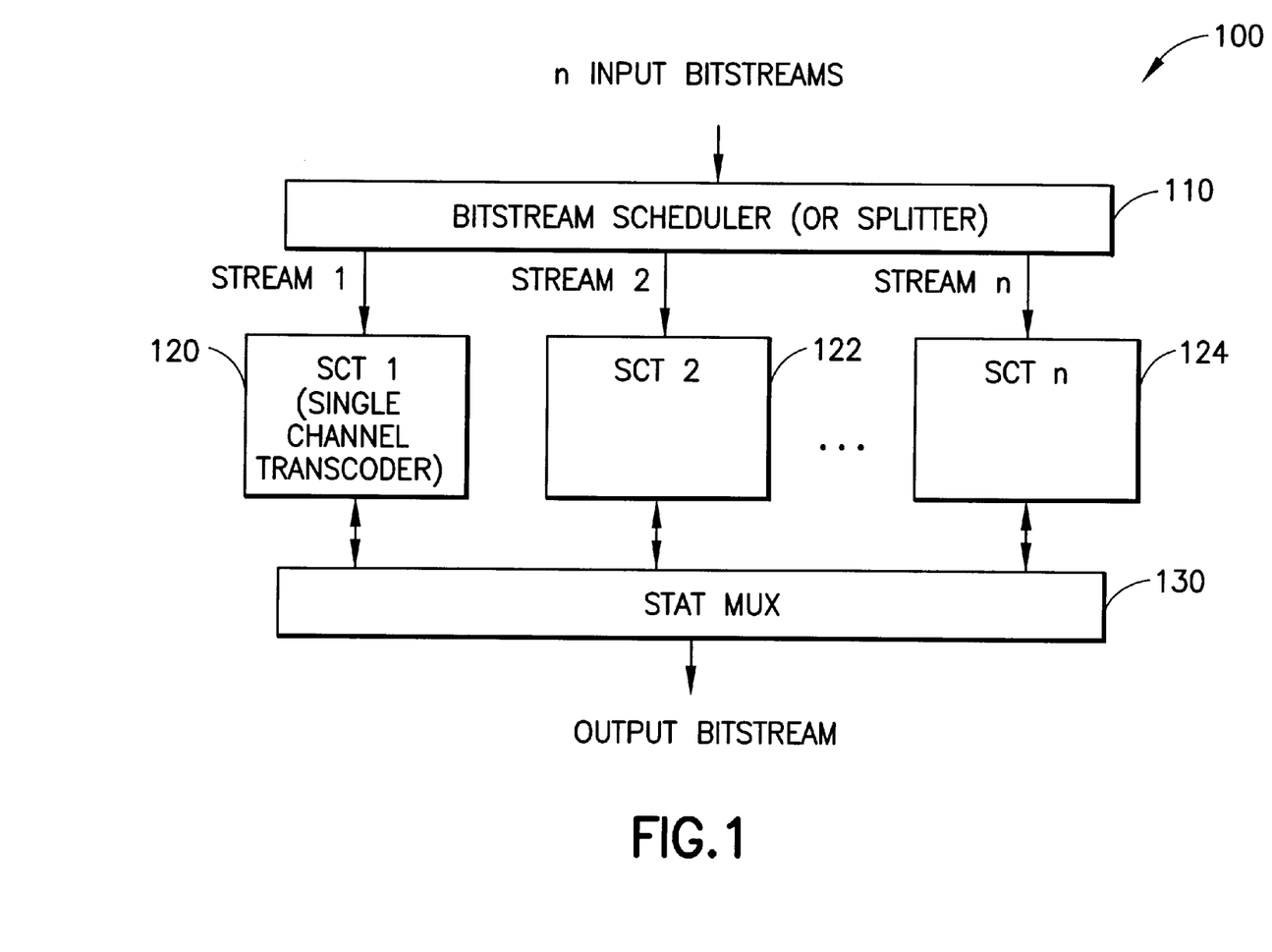
FIG. 1 illustrates a block diagram of a multi-channel video transcoder with n transcoders for n channels in accordance with the present invention.

FIG. 1 illustrates a block diagram of a multi-channel video transcoder with n transcoders for n channels in accordance with the present invention.

A multi-channel MPEG-video transcoder 100 functionally includes a bitstream scheduler or splitter 110 that receives n input bitstreams (e.g., channels), n Single-Channel Transcoders (SCTs) 120, 122, . . . , 124, for transcoding the respective bitstreams, and a Statistical Multiplexing (Stat Mux) block 130 for re-assembling the individual transcoded bitstreams into a transport stream.

As is known, statistical multiplexing is the process of encoding a number of signals at variable bit rates and combining the variable-rate bitstreams into a single fixed-rate transport stream so that the bandwidth allotted to each signal is flexible and varies with each signal's bit rate need.

The transcoder 100 show the basic data flow of the transcoding process. However, the actual implementation of this process can have many approaches.

For many practical reasons, multiple programmable processors are preferably used for implementation of the multi-channel MPEG-video transcoder. For a multiple-processor implementation, each processor is responsible for certain pieces of the transcoding process. The advantages of this approach include:

Flexibility in allowing the use of different video coding algorithms. This means that the architecture is friendly to coding algorithm improvements and modification. A new algorithm can be implemented by simply changing or re-configuring the software of each individual transcoder. For example, the transcoder algorithm may be to convert an MPEG-2 Main Profile at Main Level (MP@ML) bitstream into another MP@ML bitstream at a new rate. It can be to convert an MPEG-2 4:2:2 Profile at Main Level (422P@ML) bitstream into an MP@ML bitstream. It also can be convert an MPEG-2 Main Profile at High Level (MP@HL) bitstream to an MP@ML bitstream, and so forth.

The design risk is low so that certain number of selected chips will be able to perform tasks. That is, the architectures may be implemented using a mother board with a number of daughter cards, similar to a PC mother board with a number of PCI plug-ins. Each daughter card contains a processor and local memories. By adding more daughter cards, one can transcode more channels of video.

Improvements in processor technology. A new chip release with a faster clock rate can be adopted without major redesign. The investment in this approach and development of the software is retained as faster or cheaper chips become available within the same processor family.

More cost-effective than specialized hardware for MPEG transcoding.

Various issues for the design of a multi-channel MPEG-video transcoder must be addressed. The goal of the present invention is to use queuing system theory to implement a multi-channel MPEG-video transcoder with multiple programmable processors. Strategies and methods are developed for scheduling a queue of multiplexed n-channel bitstream units for the transcoding process.

Figure 2:
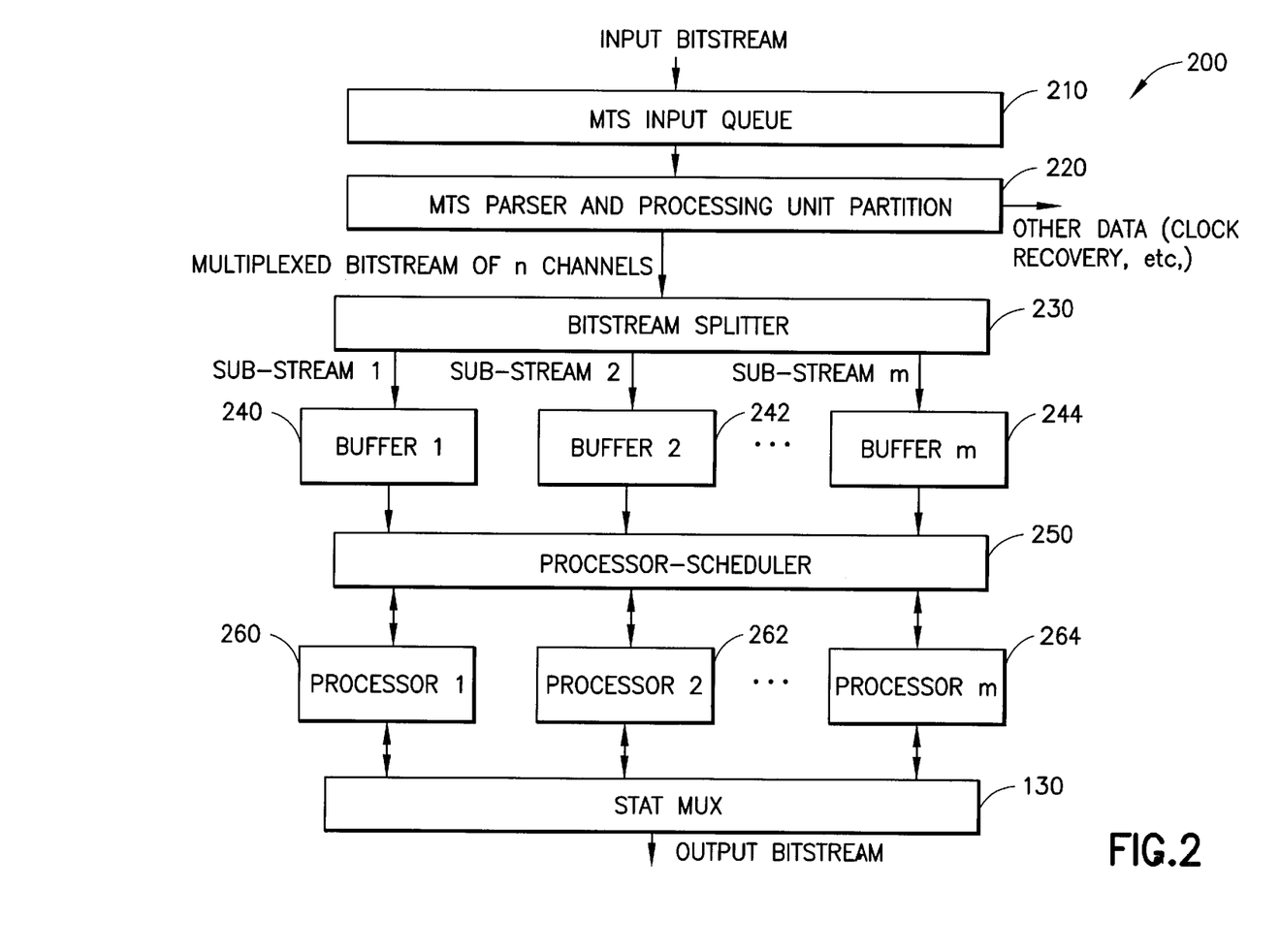
FIG. 2 illustrates a block diagram of a multi-channel video transcoder (architecture A) with a bitstream splitter for splitting n channels among m transcoding processors in accordance with the present invention.

FIG. 2 illustrates a block diagram of a multi-channel video transcoder (architecture A) with a bitstream splitter for splitting n channels among m transcoding processors in accordance with the present invention.

For the multi-channel MPEG-video transcoder 200 with multiple programmable processors, one of the important issues is to schedule a queue of bitstream units such that the transcoding process can be more efficient.

Here, a MPEG Transport Stream (MTS) is provided as an input to a MTS input queue 210. At a parser and processing unit function 220, the MTS bitstream is parsed and partitioned into "processing units" to provide a multiplexed bitstream of n channels to a bitstream splitter 230. For example the processing units may be slices or complete frames. A slice is a string of consecutive macroblocks of arbitrary length running from left to right and top to bottom across a picture. A slice header is used for re-synchronization in the event of transmission bit errors. Thus, a slice is a portion of a single frame or field.

Other processing units may be selected, as discussed below in connection with Table 1.

The function 220 also recovers other data, such as clock recovery data and Program Clock Reference (PCR) correction data, which are handled by a separate microprocessor or controller in a known manner.

A bitstream splitter 230 splits the multiplex into m individual bitstreams (e.g., sub-streams), where m can be less than, equal to, or greater than the number of channels, n. Commonly, m<n, which means that each processor has to transcode more than one channel of video data. Each sub-stream comprises successive processing units that are provided to respective buffers, e.g., buffer 1 (240), buffer 2 (242), ... buffer m (244).

A processor-scheduler 250 retrieves the processing units from buffer 1 (240), buffer 2 (242), ... buffer m (244), and provides them to the corresponding transcoding processor, e.g., processor 1 (260), processor 2 (262), ..., processor 3 (264). For example, the processing units from buffer 1 (240) are provided to processor 1 (260), the processing units from buffer 2 (242) are provided to processor 2 (262), and so forth.

The transcoded data that is output from processor 1 (260), processor 2 (262), ..., processor 3 (264) is provided to the stat mux 130 to form an output bitstream (e.g., transport stream).

Here, m identical processors (or m identical sets of processors) are chosen for performing n-channel MPEG-video transcoding. Each processor (or each set of processors) executes the same transcoding program to process one processing unit at a time.

In accordance with the present invention, there are two basic architectures for implementation. Once is an architecture of m branches of parallel processing (architecture A), shown in FIG. 2. The second architecture (architecture B) is a single branch to multi-processing, shown in FIG. 4.

For architecture A, the multiplexed bitstream of n channels is split into m sub-streams. Each processor (e.g., 260, 262, ..., 264) transcodes one sub-stream. Thus, the entire transcoding process of n-channel MPEG-video has the architecture of m branches of parallel processing.

For each branch, if the processing units are independent from each other, the transcoding process can be modeled as a M/M/1 queuing system. With this notation, the first "M" designates a Poisson arrival process, where the interarrival times of the processing units in each branch are independent, identically distributed (iid) exponential random variables. The second "M" designates that the service time (i.e., processing time for each processing unit) in the branch are iid exponential random variables. "1" specifies the number of servers (i.e., processors) in each branch, which is one in this case.

Furthermore, assume the rate of the input bitstream is given by $\lambda$ bits/sec., and the processing power of each transcoding processor 260, 262, ..., 264 is given by $\mu$ bits/sec. If the multiplexed bitstream of n channels has been evenly split into m sub-streams, the average delay $T_1$ per processing unit is approximately:

$$T_1 \approx \frac{1}{\mu} + \frac{\left(\frac{\lambda}{(m\mu)}\right)}{\mu - \frac{\lambda}{m}}, \text{ for } \frac{\lambda}{m\mu} < 1.$$

Figure 3:
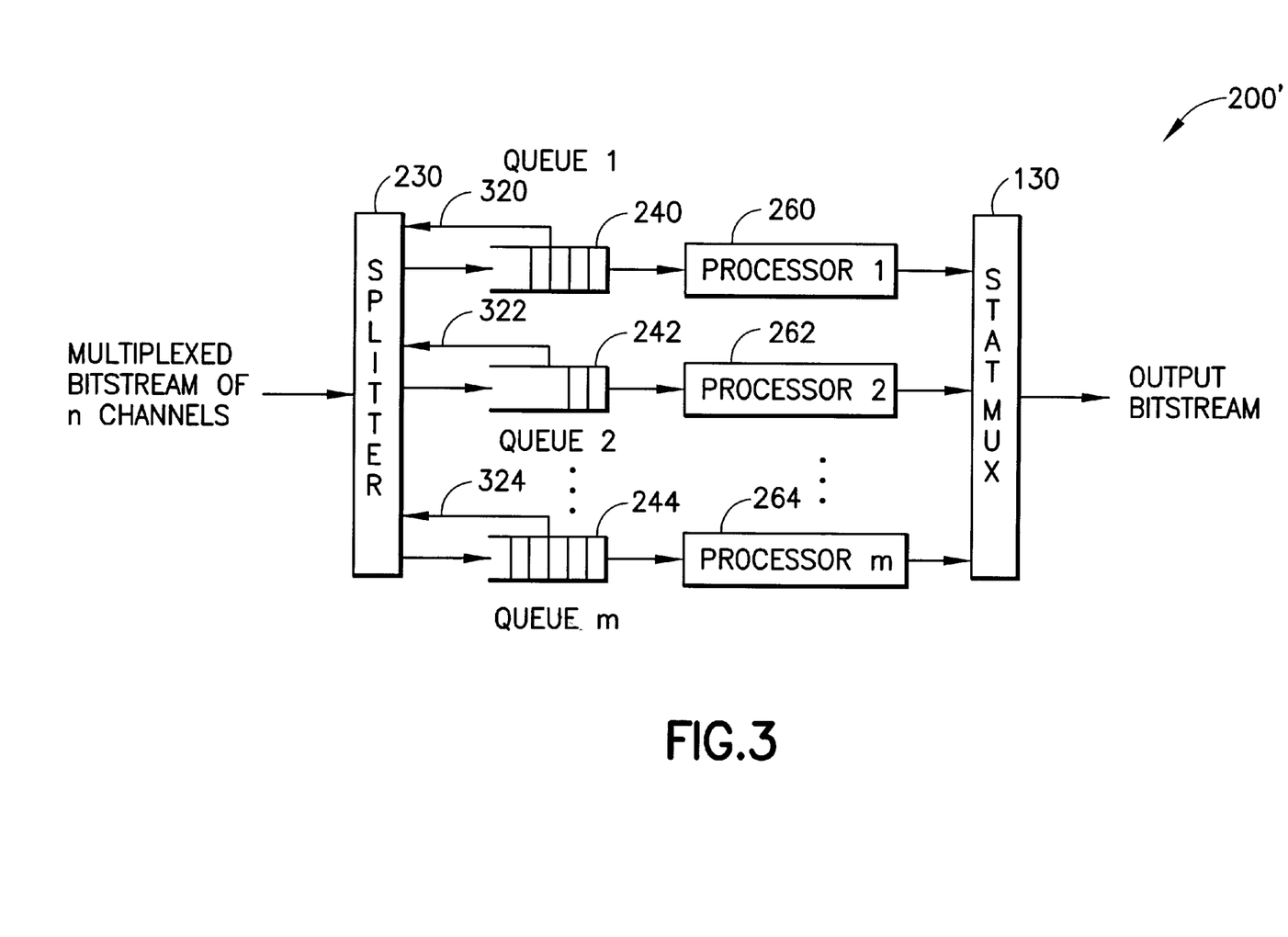
FIG. 3 illustrates the architecture of FIG. 2 wherein respective queues are provided for each of the m transcoding processors in accordance with the present invention.

FIG. 3 illustrates the architecture of FIG. 2 wherein respective queues are provided for each of the m transcoding processors in accordance with the present invention. Like-numbered elements correspond to one another in the figures.

In the transcoder 200', queue 1 (240), queue 2 (242), ..., queue 3 (244) are provided for processor 1 (260), processor 2 (262), . . processor m (264), respectively. Each queue may be implemented as a first-in, first-out (FIFO) buffer, for example, in a known manner.

Note that the fullness of the queues 1, 2, . . . , m can often be different at each moment because the computation time for different processing units is usually different. The computation time is based on factors such as the amount of data in each processing unit, bit rate, the complexity of the associated image, the encoding method, whether or not motion compensation is used, and picture type (I, P or B), for example.

Therefore, the splitter 230 should unevenly assign processing units to each queue. In particular, the performance of the transcoder 200' can be enhanced by sending the incoming processing units to the emptiest queue, i.e., in an emptiest-queue-first manner. The average delay time $T_3$ in this case can be proved to satisfy the relationship: $T_3 \leq T_1$. To implement such a splitter 230, a feedback signal of the buffer fullness is used to decide to which queue the incoming processing units should be sent. For example, optional feedback paths 320, 322, . . . , 324 can be provided for queues 240, 242, . . . , 244, respectively, for this purpose.

Figure 4:
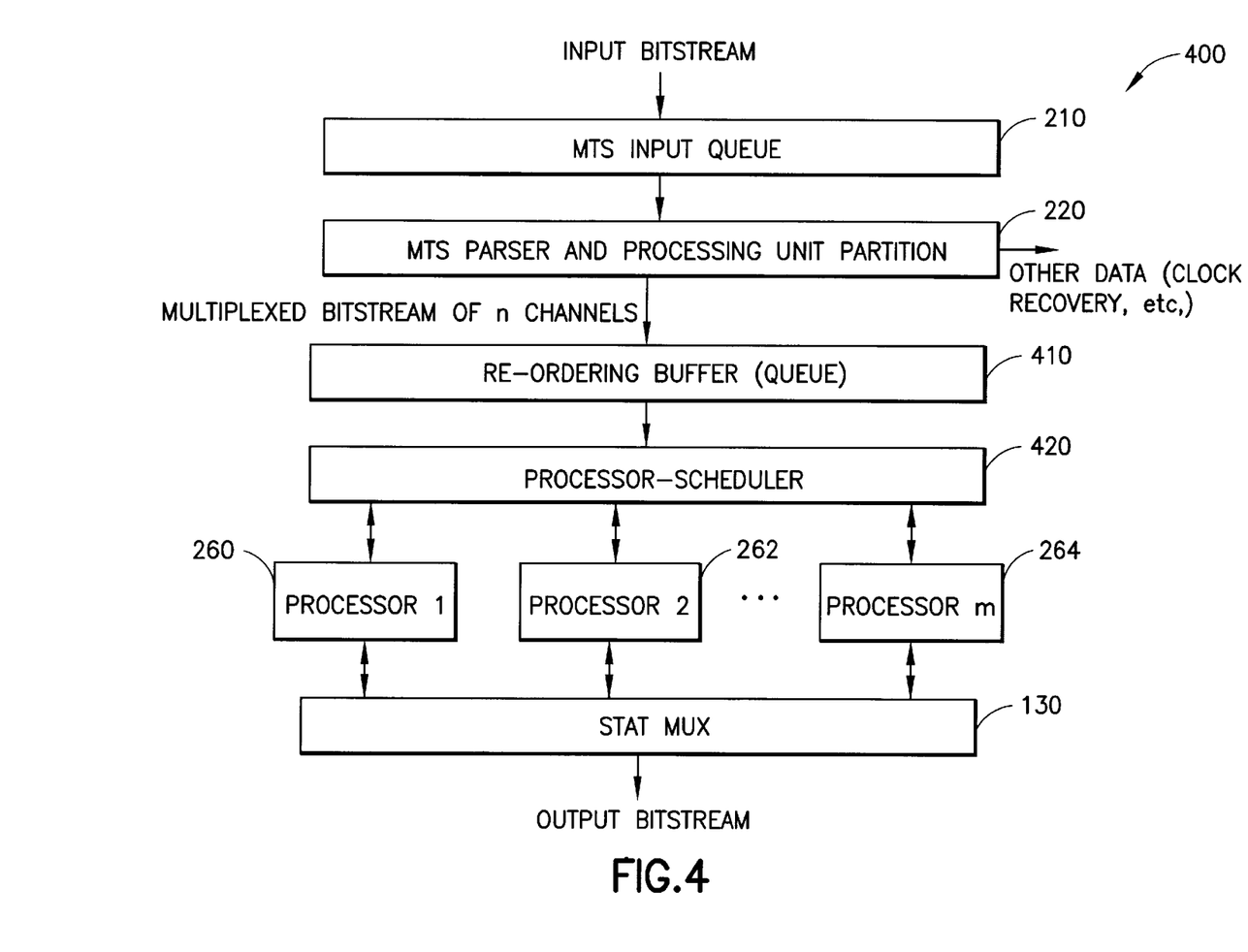
FIG. 4 illustrates a block diagram of a multi-channel video transcoder (architecture B) with a processor-scheduler for scheduling the processing of n channels among m transcoding processors in accordance with the present invention.

FIG. 4 illustrates a block diagram of a multi-channel video transcoder (architecture B) with a processor-scheduler for scheduling the processing of n channels among m transcoding processors in accordance with the present invention. This is a second architecture of the present invention, with a single branch to multi-processing.

Here, the processing units of the multiplexed bitstream of n channels are provided to a re-ordering buffer or queue 410. A processor-scheduler 420 sends each processing unit to an available processor in a round-robin manner (e.g., processor 260, then processor 262, . . . , then processor 264).

If the processing units are independent from each other, the queuing of the processing units can be modeled as a M/M/m queuing system. "m" specifies the number of servers (i.e., processors), where the processing flow is in one overall branch.

For the same assumptions above regarding $\lambda$ and $\mu$, the average delay per processing unit (for steady-state) can be estimated by:

$$T_2 \approx \frac{1}{\mu} + \frac{\left(\frac{P_Q}{m}\right)}{\mu - \frac{\lambda}{m}}, \quad \text{for} \quad \frac{\lambda}{m \cdot \mu} < 1,$$

where $P_Q$ denotes the probability that a processing unit arriving at the re-ordering buffer 410 will find all processors busy and will be forced to wait in queue.

Figure 5:
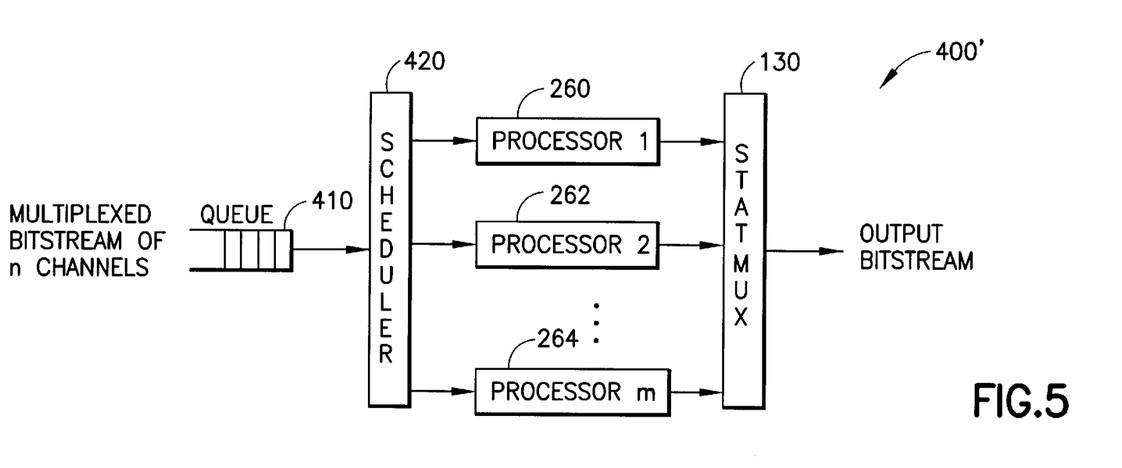
FIG. 5 illustrates the architecture of FIG. 4 wherein a queue is provided for the processor-scheduler in accordance with the present invention.

FIG. 5 illustrates the architecture of FIG. 4 wherein a queue is provided for the processor-scheduler in accordance with the present invention.

As shown, the queue 410 buffers the processing units in the multiplexed bitstream prior to forwarding them to the scheduler 420.

Noted that, for both architectures A and B, the condition $$\frac{\lambda}{m \cdot \mu} < 1$$

can be used to roughly estimate the minimum number m of processors required for the services. Now, we can compare the average delay time between $T_1$ and $T_2$. It can be shown (by using induction) that $$P_Q \leq \frac{\lambda}{m \cdot \mu}.$$

Hence, one always has $T_1 \geq T_2$. For the case that $$\frac{1}{\mu}$$

can be ignored, one has $T_1 \geq mT_2$. Therefore, architecture B always performs better than architecture A in terms of the average delay time.

Furthermore, for the two architectures given above, at issue is how to determine the processing unit, and how to schedule or split these units such that they appear to be independent with each other to their processor. That is, the processing time of each processing unit in each transcoding processor should be independent.

The basic requirement for a processing unit is that it can be easily recovered from the bitstream, and forms a basic building block of a sequence or images or a single frame or field. Moreover, the processing unit should have the capability to be processed as a complete, independent unit. For motion compensated units, a processing unit might require some reference units which are already available in the current processor or other processors. Possible candidates of processing units for various video coding standards are summarized in Table 1.

While possible processing units are disclosed for the video standards listed, the invention can be adapted for use with essentially any video coding standard, including derivations of those listed. Moreover, the processing unit can comprise a portion frame or field, or an entire frame or field.

TABLE 1

| Video Standards | MPEG-2 | MPEG-1 | H.263 | H.261 | H.263+ | MPEG4 |
|---|---|---|---|---|---|---|
| Possible processing units | Frame, field, slice | Frame, | Frame, Group of Blocks (GOB), | Frame, GOB | Frame, GOB | Frame, Video Object Plane (VOP) |
| Smallest processing unit | slice | frame | GOB | GOB | GOB | VOP |

A GOB may comprise, e.g., 33 macroblocks.

A VOP comprises a video object in a frame.

Note that the smallest processing unit (usually) cannot be a macroblock for the architecture of FIG. 4 because of direct current (DC) prediction of spatial transform coefficients, and motion vector prediction. The slices in a single frame are independent with each other to their processors since the amount of data in each slice is generally uncorrelated.

A larger processing unit generally requires a larger buffering capability.

Moreover, certain information for each processing unit must be stored such that the transcoded bitstreams can be correctly ordered, multiplexed and transmitted. This information includes channel number, frame number (represented by temporal reference word "temp_ref" for MPEG-2), and processing unit number (e.g., slice number) for each frame of each channel.

The requirement on independence between processing units is critical to the computational performance of the transcoders of the present invention. However, the processing units, e.g., frames or slices in MPEG-2 video, in a single video bitstream are often correlated to each other because of motion prediction.

For architecture A, such a correlation will not cause any problem if processing units of a single video bitstream are sent to the same processor. In this case, these units will be processed sequentially and all information required for motion prediction can be obtained from the previous processed units.

However, for architecture B, or for architecture A when processing units of a single video bitstream can be sent to different processors, a "protection protocol" is required to prevent correlated processing units being processed in different processors at the same time. Such a protocol is discussed below in connection with FIG. 7.

For architecture B, it is desirable to avoid the situation wherein one predicted processing unit is assigned to a processor while its reference macroblocks are still being processed in one or more other processors, and are therefore not yet available. In accordance with the present invention, a scheme is disclosed to avoid this situation by interleaving the coded frames of different video bitstreams.

For example, assume that a coded MPEG-2 video bitstream has the following frame order (transmission order):

$\underline{I_1}\ \underline{P_1}\ \underline{B_1B_2P_2}\ \underline{B_3B_4P_3}\ \underline{B_5B_6P_4}\ \underline{B_7B_8P_5}\ldots$ where I, P and B represent the picture types, and the subscript represents an order of each picture type in the bitstream. Also, assume that the processing units are slices. Then, the slices in each underlined picture grouping, e.g. $\underline{I_1}, \underline{P_1}, \underline{B_1\ B_2P_2}$, etc. are uncorrelated with other slices in the same grouping. For example, for the picture grouping $\underline{I_1}$, consisting of a single frame with several slices, generally the data in each slice will be uncorrelated with the data in other slices in the same frame. For the picture grouping $\underline{B_1B_2\ P_2}$, $B_1$, $B_2$ and $P_2$ are uncorrelated with one another.

However, slices between the adjacent picture groups in the bitstream may be correlated. For example, consider the case where a predicted processing unit (e.g., a slice in $B_1$) is the first unit in the queue to be assigned to an available processor, but its reference macroblocks (e.g., some macroblocks in $P_1$) are still being processed in one or more other processors. Moreover, $B_1$ and $P_1$ are in different groupings. Then, this predicted processing unit cannot be processed until its reference macroblocks are ready. This delay can cause some processors to be idle.

To minimize the idle time, one approach is to re-interleave a video bitstream with other video bitstreams to ensure that every processing unit always has its reference macroblocks available before it is the first unit in queue. Essentially, the uncorrelated pictures in a common grouping are re-ordered to be closer to each other, or preferably adjacent, while different correlated groupings are spaced apart.

Thus, the uncorrelated pictures of the same grouping can be processed by the same or different processor at the same time, while the time between processing of pictures in different groupings is increased so that reference units in one grouping can be made available without delay for processing of the predicted pictures of another grouping. Overall throughput is not decreased since pictures from other channels are being processed in between processing of the groupings of a given channel.

For example, assume that there is another video bitstream $\underline{i_1p_1}\ \underline{b_1p_2}\ \underline{b_2p_3}\ldots$ in the transport stream, and the original multiplexed bitstream in the transport stream has the order:

$\underline{I_1i_1p_1}\ \underline{P_1}\ \underline{B_1b_1p_2}\ \underline{B_2P_2}\ \underline{B_3b_2p_3B_4P_3}\ \underline{B_5B_6P_4}\ldots$ The coded-picture re-ordering buffer 410 (or the buffers 240, 242, . . . , 244), can re-arrange the bitstream order as follows to reduce the processor idle time:

$\underline{I_1P_1}\ \underline{i_1p_1}\ \underline{B_1B_2P_2}\ \underline{b_1p_2}\ \underline{B_3B_4P_3}\ \underline{b_2p_3B_5B_6P_4}\ldots$ Such a re-interleaving process is, sometimes, limited by the actual allowed delay of each video bitstream. Other approaches, which are not restrained by this limitation, can be applied. One example, discussed next, is a dual-buffer scheme modified from the architecture of FIGS. 4 and 5.

Re-ordering may be used for the any of the architectures discussed herein.

Figure 6:
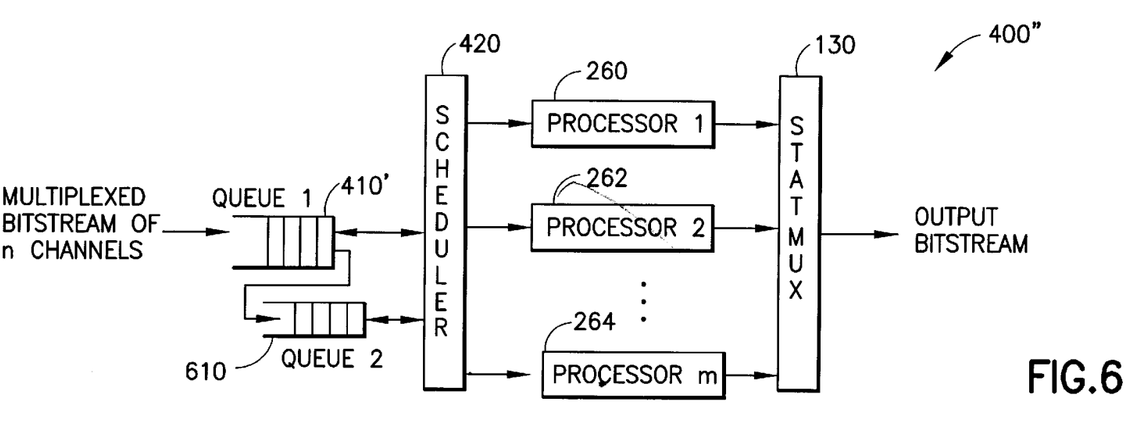
FIG. 6 illustrates the architecture of FIG. 4 wherein an additional priority queue is provided for the processor-scheduler in accordance with the present invention.

FIG. 6 illustrates architecture B wherein an additional priority queue is provided for the processor-scheduler in accordance with the present invention.

In this scheme, a first queue, queue 1 (410') is used to buffer reference image processing units. A second queue, queue 2 (610) is used to temporally buffer predicted processing units whose reference macroblocks (i.e., reference image processing unit) is not available yet. The processing units in queue 2 (610) have a higher priority in being assigned to a processor when their references units are available, and there is an available processor. Therefore, it is a priority queue model.

Note that the priority queue model may also be used with the architecture of FIG. 2 when a single video stream is carried in the same sub-stream. For example, an additional priority queue can be added to each of the queues 240, 242 and 244 of FIG. 3.

Figure 7:
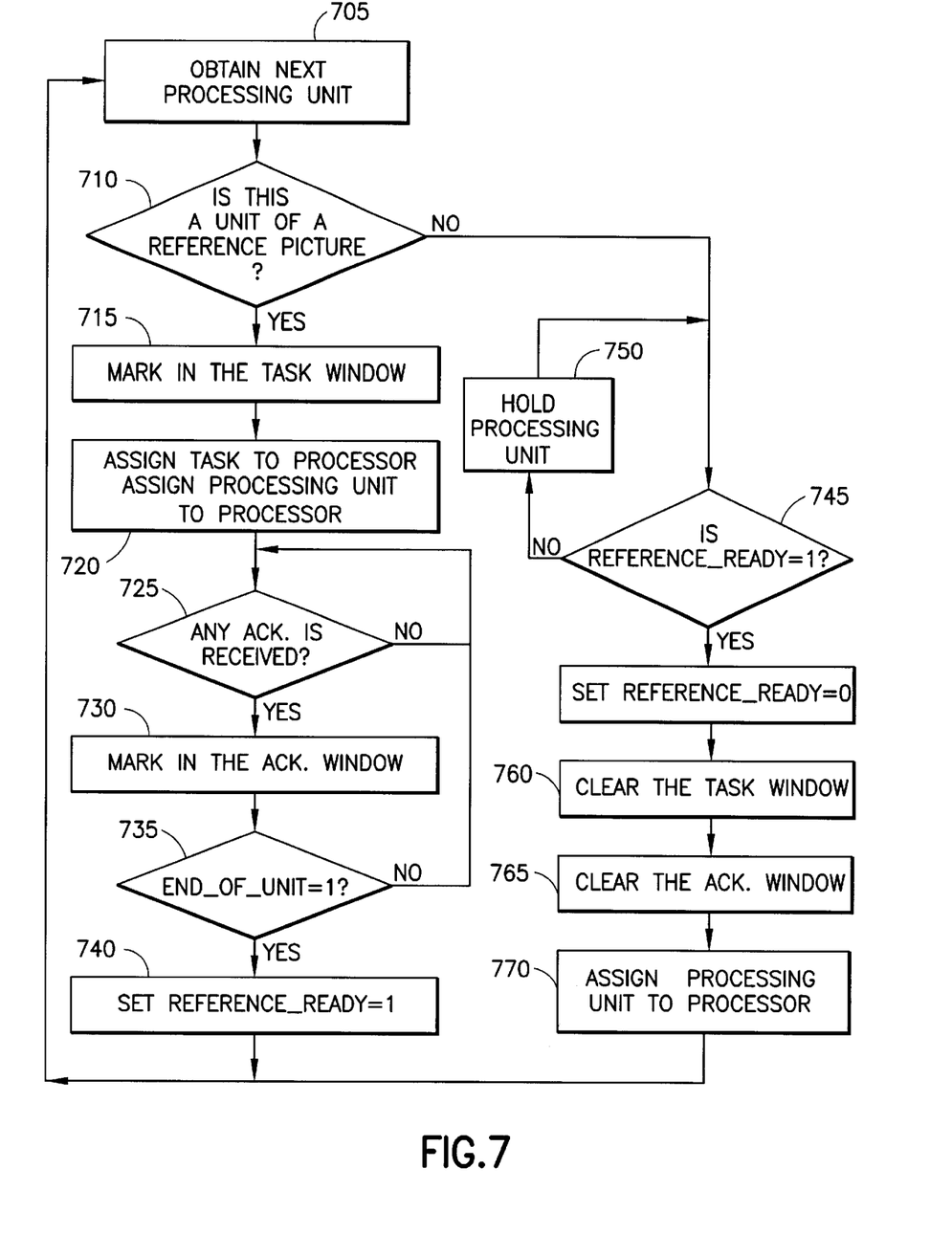
FIG. 7 illustrates a protection protocol for verifying that data has been processed in accordance with the present invention.

FIG. 7 illustrates a protection protocol for verifying that data has been processed in accordance with the present invention. A protection protocol is disclosed herein for preventing correlated processing units from being processed in different processors at the same time. The protocol can be implemented by the processor-scheduler 250 for the transcoder of FIG. 2 and the processor-scheduler 420 for the transcoder of FIG. 4.

Note that any know syntax and communication protocol may be used for implementing the protection protocol, including implementation of the task and acknowledgment windows, and for sending and receiving information between the processor-scheduler and the transcoding processors.

When there are multiple bitstreams of video, or a single HDTV bitstream, the processor that processes the reference processing unit might slow down and fall behind such that the predicted processing unit and its (correlated) reference -processing unit are processed in different processors at the same time. This can result in a non-optimized minimum average processing time. The protection protocol prevents this problem.

The protection protocol uses pre-defined windows, or lists, to verify the "finished" processing units by the processors. For the buffers 240, 242, . . . , 244 of the FIG. 2 embodiment, or the buffer 410 of the FIG. 4 embodiment, the processor-scheduler has both a task window and an acknowledgment window. The task window sequentially assigns processing units of the anchor/reference pictures (I- and P-pictures for MPEG-2 video) to the available processors. The acknowledgment window indicates that the processed units corresponding to the task window have been processed. By using the windows, the protocol needs to keep track of only part of the processing units that the task window has assigned, and the acknowledgment window has indicated. These windows are operated and refreshed from anchor picture to anchor picture.

At block 705, the next processing unit is obtained from a buffer by the processor-scheduler. At block 710, if the processing unit is part of a reference picture, or is an entire reference picture itself (such as a full frame or field), the processor-scheduler marks the unit in its task window (block 715). The processor-scheduler may have a memory for this purpose that lists identifying data of the processing unit, such as channel number, frame number, and processing unit number (e.g., slice number).

At block 720, the processor-scheduler assigns a task to an available processor to process the reference processing unit, and forwards the processing unit data to that processor. At block 725, the processor-scheduler waits to receive an acknowledgment from the processor that the task has been received. When the acknowledgment is received, the processor-scheduler makes an appropriate notation in its acknowledgment window (block 730).

At block 735, an appropriate flag is set ("end_of_unit= 1") if the processor has completed processing a reference processing unit, and at block 740, an appropriate flag is set (e.g., "reference_ready=1") indicating that the reference processing unit is available for use by any processor that is assigned to process the associated predicted processing unit.

Note that the protocol provides a general program flow. Appropriate tailoring of the protocol should be made, e.g., for units from B- and P-pictures. For example, a unit from a B-picture requires two reference units for motion compensation. Accordingly, the "reference_ready" flag should be set only when both reference units are ready. Moreover, a unit from a P-picture can be an anchor unit (for a B-picture unit), as well as a predicted unit (where an I-picture unit is the anchor unit). Additionally, it should be understood that multiple processors are being tracked at the same time, and multiple sets of reference and processing units can be tracked at the same time, as required.

For example, each processor may contain reference buffers for the two reference units (forward and backward prediction) that can be accessed by the other processors to acquire the reference unit data. A third buffer may be provided for each processor for the current unit, e.g., for B-pictures. Moreover, processed anchor frame units (I or P) can always be stored in reference buffers regardless of whether they are referenced. A frame buffer pointer swaps between the two reference buffers since the current backward prediction reference buffer will be the forward prediction reference buffer at the next moment.

Known MPEG parameters can be used to detect the frame type of a processing unit.

Note that when a processing unit is a subset (such as a slice) of a full picture (such as a frame or field), it can be made available immediately since motion compensation of regions in a predicted processing unit typically requires reference data from within only one reference processing unit. This "push" approach will save processing time, but requires a larger buffer for each processor, and more DMA transfer between processors. This is true since, when a processing unit in a reference frame is uncompressed, it does not know which other processor in the future will use it as a reference. Thus, it has to broadcast to all processors. The second way to implement DMA is to have each -processor to store its own decoded reference units, and for each processor to "pull" the required reference units from other processors. This is slower in term of processing time, but it will save DMA and memory.

If desired, the several processing units that comprise the picture can be processed, stored temporarily until all units in a picture are processed, and made available together as an entire picture.

A block 710, if the processing unit is not part of a reference picture, i.e., is a predicted picture, the processor examines the flag "reference_ready" to see if the associated reference unit is available (block 745). If not, a hold mode is entered (block 750). If the reference unit or units is/are ready, the processor-scheduler resets the "reference_ready" flag (block 755), clears the task window (block 760), and clears the acknowledgment window (765). This means that there are no pending tasks, e.g., there are no reference processing units for the current predicted processing unit that have not yet been processed.

Accordingly, at block 770, the predicted processing unit is assigned and provided to a processor.

Based on a request from the relevant processor, the required reference processing units are transferred to the predicted unit's processor for use in motion compensating the predicted unit. This data transfer may occur using a Direct Memory Access (DMA) transfer by a bus. Known computer architectures may be employed for this purpose and therefore are not discussed in detail. Generally, the processor-scheduler maintains a record of which processors the reference and predicted unit were assigned to, and can coordinate the necessary transfer.

Moreover, each processor has its own local memory for storing reference and predicted processing units. Each processor may also have its own buffer for storing transcoded processing unit(s) prior to forwarding it to the stat mux.

Known stat mux techniques govern the transfer the transcoded data from each processor to the stat mux.

Note that the reference processing units were previously transcoded and provided to the stat mux (or else are currently waiting to be provided to the stat mux). The reference processing unit data that is used by the predicted unit's processor for motion compensation of the predicted unit is in an uncompressed, pixel domain format, and is discarded after use.

Both task and acknowledgment windows have the same size, in units, of the number of processing units. This size is determined by the number of processing units per reference picture.

As long as the acknowledgments begin flowing back regularly from the processors to the processor-scheduler, the bitstream flows smoothly and efficiently.

Thus, the protection protocol avoids having a reference processing unit and its correlated one or more predicted processing units from being processed at the same time by delaying the processing of the predicted processing unit until after the processing of the reference processing unit. As a result, the average delay of the processors is expected to be minimized in accordance with the M/M/1 or M/M/m queuing theory.

In a further aspect of the present invention, the following processing unit re-ordering method can be applied to the multi-channel transcoder architectures discussed herein. Each processing unit has its own size which usually determines the computation power required. The larger the size, the more computation power required. For a software implementation, it is often true that the larger the size of the processing unit, the greater the processing delay. To minimize such a delay, the following re-ordering process can be applied for each channel.

Specifically, the processing units in each picture are re-ordered in re-ordering buffers. Each re-ordering buffer (queue) is designed for assigning processing units of the channel to processors according to the rule of shortest-size-processing unit-first. In this case the model of the queues becomes M/G/1 for the m branches of parallel processing architecture of FIG. 2, and M/G/m for the single branch to multi-processing architecture of FIG. 4. The priorities are assigned by labeling the i-th processing unit of the k-frame at time t by $U_i^k(t)$, and denoting the size (in bits) of this unit by $S_i^k(t)$. For example, assume that a bitstream after the MTS parser and processing unit partition 220 has the order of processing units as follows.

$U_1^k(t), U_2^k(t), \ldots, U_L^k(t)$

Also, assume that $S_1^k(t) < S_L^k(t) < S_2^k(t) < S_{L-3}^k(t) < \ldots < S_3^k(t) \ldots$ Then the order of processing units in the output of the re-ordering buffer 410 is $U_1^k(t), U_L^k(t), U_2^k(t), U_{L-3}^k(t), \ldots, U_3^k(t) \ldots$ In conclusion, the selection of an architecture for implementing a multi-channel MPEG-video transcoder should be made on the basis of performance and cost trade-offs. Assuming that the required total processing power is P, then, from the point of view of reducing the average delay per processing unit, the following is noted:

For the case that a multiplexed n-channel bitstream is scheduled for m processors (each having a processing power P/m), for a smaller m, the smaller the average delay per processing unit is the system. The minimum average delay is provided when m=1, e.g., in the case of the M/M/1 queuing system.

For the case of a given number m of processors, the approach of pre-splitting the multiplexed n-channel bitstream into m sub-streams (each sub-stream sending to each processor) will have more system delay than the approach of directly scheduling a multiplexed n-channel bitstream for m processors.

For a pre-determined block of processing units, the average delay can be reduced by re-ordering of the processing units in the block such that the processing units with smaller sizes are processed first.

The architecture of FIG. 2 is less complex to implement because: (a) the speed requirement for the bitstream splitter 230 is much lower than that for the processor-scheduler 420 in the architecture of FIG. 4, and (b) the control protocol is simpler.

Accordingly, it can be seen that the present invention provides a method and apparatus for an efficient transcoder that uses multiple individual transcoding processors. In a first architecture (architecture A), an input bitstream of n channels is partitioned into processing units, the processing units are split into m sub-streams, and each sub-stream is processed in a corresponding branch. A queue is provided for each sub-stream. In a second architecture (architecture B), the processing units are assigned to any available processor. One queue is provided for all processors. Or, in a priority-queue scheme, a priority queue is used to hold predicted picture units so they have priority in being assigned to a processor when their reference units have been processed.

One option to enhance architecture A is to provide a buffer fullness feedback signal for each of the m branches, and to adjust the splitting of the bitstream such that the incoming data is sent to the emptiest queue (buffer).

With another enhancement for either architecture A or B, the processing units can be re-ordered in the queue(s) according to a shortest-size-first technique.

A further possible enhancement for architecture A, when a single video stream is split into different sub-streams, and for architecture B, is to interleave the frames of different video bitstreams to ensure that every predicted processing unit has its reference processing unit available before the predicted processing unit is first in its queue.

A further possible enhancement for architecture A, when one or more of the video streams are split into different sub-streams, and for architecture B, is to provide a protection protocol that keeps track of predicted processing units and their correlated reference processing units to ensure that they are not processed at the same time (in different processors). The protection protocol delays the processing of the predicted processing unit until its corresponding reference processing unit has been processed. The transfer of the uncompressed reference processing unit to the predicted unit's processor for motion compensation processing is also coordinated.

By ensuring that correlated processing units are not processed at the same time, a minimum average processing delay can be achieved, and the throughput of the transcoder is enhanced.

Moreover, the above enhancements can generally be implemented at the same time.

A further benefit is that the transcoder architectures of the present invention can easily accommodate one or more failed processor by routing the data only to the operating processors.

The invention is suitable for transcoding multiple channels, such as standard definition video channels, or a single high-bit rate channel, such as an HDTV channel, for example.

Although the invention has been described in connection with various specific embodiments, those skilled in the art will appreciate that numerous adaptations and modifications may be made thereto without departing from the spirit and scope of the invention as set forth in the claims.

For example, while various syntax elements have been discussed herein, note that they are examples only, and any syntax may be used.

Moreover, while the invention has been discussed in connection with the MPEG-2 standard, it should be appreciated that the concepts disclosed herein can be adapted for use with any similar communication standards, including derivations of the current MPEG-2 standard.

Furthermore, the invention is suitable for use with virtually any type of network, including cable or satellite television broadband communication networks, local area networks (LANs), metropolitan area networks (MANs), wide area networks (WANs), internets, intranets, and the Internet, or combinations thereof.

What is claimed is:

1. A method for transcoding a bitstream comprising digital video data, comprising the steps of:
    partitioning the bitstream into a plurality of successive processing units;
    queuing the processing units; and
    assigning each of the queued processing units according to a queuing system model to a respective one of a plurality of transcoding processors arranged in parallel.

2. The method of claim 1, wherein:
    in accordance with the queuing system model, the queued processing units are assigned to the transcoding processors so that particular ones of the queued processing units that are independent from each other are processed concurrently thereat.

3. The method of claim 1, wherein:
    the queued processing units include a queued processing unit of a reference image, and a queued processing unit of a predicted image thereof; and
    in accordance with the queuing system model, the queued processing units are assigned to the transcoding processors such that the queued processing unit of the reference image and the queued processing unit of the predicted image are not processed concurrently.

4. The method of claim 1, wherein the processing units include at least one of:

slices, frames, fields, Video Object Planes (VOPs), and Groups of Blocks (GOBs).

5. The method of claim 1, wherein:

in said queuing step, the partitioned processing units are queued in a common queue; and in said assigning step, the queued processing units are assigned to the transcoding processors from the common queue.

6. The method of claim 5, wherein, in said queuing step:

the partitioned processing units are queued in the common queue in a shortest-size-processing unit-first manner.

7. The method of claim 5, the bitstream has only one video channel.

8. The method of claim 1, wherein:

the processing units include a processing unit of a reference image, and a processing unit of a predicted image thereof;

in said queuing step, the processing unit of the reference image is queued in a first queue, and the processing unit of the predicted image is queued in a second, priority queue; and in said assigning step, after the queued processing unit of the reference image is assigned to the respective transcoding processor for processing, the queued processing unit of the predicted image has priority in being assigned to its respective transcoding processor.

9. The method of claim 8, wherein, in said queuing step:

the partitioned processing units are queued in the first and second queues in a shortest-size-processing unit-first manner.

10. The method of claim 1, comprising the further steps of:

splitting the successive processing units into a plurality of sub-streams;

in said queuing step, the sub-streams of processing units are queued in respective queues; and in said assigning step, the queued processing units are assigned to the transcoding processors from the respective queues.

11. The method of claim 10, wherein:

the bitstream comprises a plurality of video channels.

12. The method of claim 10, wherein, in said queuing step:

the sub-streams of processing units are queued in the respective queues in a shortest-size-processing unit-first manner.

13. The method of claim 10, wherein, in said queuing step:

the sub-streams of processing units are queued in the respective queues in an emptiest-queue-first manner.

14. The method of claim 1, wherein the bitstream comprises at least first and second video channels with respective pictures in respective picture orders, comprising the further step of:

interleaving the pictures of the first video channel with the pictures from the second video channel such that correlated pictures of the respective first and second video channel are spaced further apart than in the respective picture orders.

15. The method of claim 1, wherein the bitstream comprises at least first and second video channels with respective groupings of pictures in respective grouping orders, each grouping comprising one picture, or a plurality of uncorrelated pictures, comprising the further step of:

interleaving the groupings of pictures of the first video channel with the groupings of pictures from the second video channel such that correlated groupings of the respective first and second video channel are spaced further apart than in the respective grouping orders.

16. The method of claim 1, wherein, in said assigning step, the queued processing unit of a reference image, and the queued processing unit of a predicted image thereof are assigned to respective ones of the transcoding processors, comprising the further step of:

delaying processing of the queued processing unit of the predicted image at the transcoding processor to which it was assigned until the queued processing unit of the reference image has been processed.

17. The method of claim 16, comprising the further steps of:

maintaining a record of the assigned queued processing unit of the reference image, the assigned queued processing unit of the predicted image thereof, and the transcoding processors to which they were assigned in said assigning step; and updating the record when the queued processing unit of the reference image has been processed by the transcoding processor to which it was assigned;

wherein said delaying step is responsive to said updating step.

18. The method of claim 16, comprising the further step of:

providing the queued processing unit of the reference image from the transcoding processor to which it was assigned, after processing thereat, to the transcoding processor to which the queued processing unit of the predicted image was assigned.

19. An apparatus for transcoding a bitstream comprising digital video data, comprising:

means for partitioning the bitstream into a plurality of successive processing units;

means for queuing the processing units;

a plurality of transcoding processors arranged in parallel; and means for assigning each of the queued processing units according to a queuing system model to a respective one of the plurality of transcoding processors.

20. The apparatus of claim 19, wherein:

said queuing means comprises a common queue for queuing the partitioned processing units; and said assigning means assigns the queued processing units to the transcoding processors from the common queue.

21. The apparatus of claim 19, further comprising:

a splitter for splitting the successive processing units into a plurality of sub-streams;

wherein said queuing means comprises respective queues for queuing the sub-streams of processing units; and said assigning means assigns the queued processing units to the transcoding processors from the respective queues.

* * * * *